US011349152B2

United States Patent
Cheng et al.

(10) Patent No.: US 11,349,152 B2
(45) Date of Patent: May 31, 2022

(54) CARBON CONDUCTIVE ADDITIVES FOR LITHIUM ION BATTERY

(71) Applicant: NEC CORPORATION, Tokyo (JP)

(72) Inventors: Qian Cheng, Tokyo (JP); Katsumi Maeda, Tokyo (JP); Noriyuki Tamura, Tokyo (JP); Mika Shiba, Tokyo (JP)

(73) Assignee: NEC CORPORATION, Tokyo (JP)

( * ) Notice: Subject to any disclaimer, the term of this patent is extended or adjusted under 35 U.S.C. 154(b) by 230 days.

(21) Appl. No.: 16/631,540

(22) PCT Filed: Jul. 20, 2017

(86) PCT No.: PCT/JP2017/026323
§ 371 (c)(1),
(2) Date: Jan. 16, 2020

(87) PCT Pub. No.: WO2019/016925
PCT Pub. Date: Jan. 24, 2019

(65) Prior Publication Data
US 2020/0203767 A1   Jun. 25, 2020

(51) Int. Cl.
*H01M 10/0567*  (2010.01)
*H01M 10/0569*  (2010.01)
(Continued)

(52) U.S. Cl.
CPC ....... *H01M 10/0567* (2013.01); *H01M 4/525* (2013.01); *H01M 4/625* (2013.01);
(Continued)

(58) Field of Classification Search
CPC ......... H01M 10/0525; H01M 10/0567; H01M 10/0568; H01M 10/0569; H01M 2004/028; H01M 4/525; H01M 4/625
See application file for complete search history.

(56) References Cited

U.S. PATENT DOCUMENTS

2011/0171364 A1   7/2011   Xing et al.
2011/0171371 A1   7/2011   Li et al.
(Continued)

FOREIGN PATENT DOCUMENTS

| JP | 2009-064574 A | 3/2009 |
| JP | 2012-099467 A | 5/2012 |

(Continued)

OTHER PUBLICATIONS

Written Opinion for PCT/JP2017/026323, dated Oct. 10, 2017.
(Continued)

*Primary Examiner* — Carlos Barcena
(74) *Attorney, Agent, or Firm* — Sughrue Mion, PLLC (57) ABSTRACT

The invention provides a lithium ion battery, including an anode, a cathode and an electrolytic solution including imide anion based lithium salt and $LiPO_2F_2$. The cathode includes a cathode active material particle and a carbon conductive additive forming an island-bridge structure on the surface of the cathode active material particle. The carbon conductive additive includes graphenes partially covered with the surface of the cathode active material particle to form an island structure, carbon blacks attached on the surface of the graphene and carbon nanotubes connecting between graphenes as a bridge structure.

18 Claims, 4 Drawing Sheets

(51) Int. Cl.
*H01M 10/0525* (2010.01)
*H01M 4/525* (2010.01)
*H01M 4/62* (2006.01)
*H01M 4/02* (2006.01)

(52) U.S. Cl.
CPC ... *H01M 10/0525* (2013.01); *H01M 10/0569* (2013.01); *H01M 2004/028* (2013.01)

(56) References Cited

U.S. PATENT DOCUMENTS

| | | | |
|---|---|---|---|
| 2012/0088151 | A1 | 4/2012 | Yamazaki et al. |
| 2013/0004657 | A1 | 1/2013 | Xu et al. |
| 2014/0332731 | A1 | 11/2014 | Ma et al. |
| 2015/0004488 | A1 | 1/2015 | Abdelsalam et al. |
| 2015/0037673 | A1* | 2/2015 | Zaghib ............... H01M 4/1391 429/221 |
| 2015/0123050 | A1 | 5/2015 | Yamazaki et al. |
| 2015/0270536 | A1 | 9/2015 | Kawakami et al. |
| 2017/0309948 | A1 | 10/2017 | Azami |

FOREIGN PATENT DOCUMENTS

| | | | |
|---|---|---|---|
| JP | 2012-099468 A | 5/2012 | |
| JP | 2014-532263 A | 12/2014 | |
| JP | 2015-002122 A | 1/2015 | |
| JP | 2015-510666 A | 4/2015 | |
| JP | 2015-115106 A | 6/2015 | |
| JP | 2016-025077 A | 2/2016 | |
| JP | 2016-509739 A | 3/2016 | |
| JP | 2016-146341 A | 8/2016 | |
| JP | 2016-184462 A | 10/2016 | |
| JP | 2016184462 A * | 10/2016 | ........ H01M 10/0567 |
| JP | 2017-084788 A | 5/2017 | |
| JP | 2017-095329 A | 6/2017 | |
| WO | 2014/034635 A1 | 3/2014 | |
| WO | 2016/063813 A1 | 4/2016 | |
| WO | 2017/047280 A1 | 3/2017 | |

OTHER PUBLICATIONS

International Search Report for PCT/JP2017/026323, dated Oct. 10, 2017.
Japanese Office Action for JP Application No. 2020-523847 dated Feb. 16, 2021 with English Translation.
Japanese Office Communication for JP Application No. 2020-523847 dated Sep. 21, 2021 with English Translation.

* cited by examiner

CARBON CONDUCTIVE ADDITIVES FOR LITHIUM ION BATTERY

CROSS REFERENCE TO RELATED APPLICATIONS

This application is a National Stage of International Application No. PCT/JP2017/026323 filed Jul. 20, 2017.

TECHNICAL FIELD

The present invention relates to a new system for fast chargeable lithium ion batteries, with a carbon conductive additive foliating an island-bridge structure.

BACKGROUND ART

Lithium-ion (Li-ion) batteries have been widely used for portable electronics, and they are being intensively pursued for hybrid Vehicles (HVs), plug-in hybrid vehicles (PHVs), electric vehicles (EVs), and stationary power source applications for smarter energy management systems. The greatest challenges in adopting the technology for large-scale applications are the energy density, power density, cost, safety, and cycle life of current electrode materials. Of all the properties, the charging time as well as the power density is the most important characteristics for the battery, especially as the application targets of Li-ion batteries move from small mobile devices to transportation. This is because EV users, for example, are hardly to wait more than half an hour to charge their vehicles during a long drive compared with a refueling period of less than 5 min for gasoline cars. The speed of charge greatly depends on the lithiation rate capability of anode materials, cathode materials, electrolyte as well as solvent.

At present, there are several ways to increase the rate performance of lithium ion batteries, such as using lithium titanium oxide as anode, decreasing mass loads of both anode and cathode, and using lithium iron phosphate as cathode. However, the most simple and effective way is to add more conductive additives to an electrode for improving electronic conductivity. Carbon black or acetylene black is the most frequently used as a conductive additive for a lithium ion battery. However, it is hardly to improve the rate performance of current battery with high energy density design by merely adding the conductive additive. Meanwhile, carbon nanotubes (CNTs) can improve the electrode conductivity, but the cathode electrodes containing only CNTs as a conductive additive usually lead to lower capacity and poor rate performance since the good conductance between active material particles cannot be provided by using CNTs only. Graphene is another optional conductive additive for lithium ion battery. However, the two-dimensional graphene has covered the surface of active materials so that the lithium ion diffusion path is blocked.

On the other hand, a non-aqueous electrolytic solution is frequently used in current lithium ion battery industry. In particular, mixed solvents of cyclic carbonate such as ethylene carbonate (EC) and propylene carbonate (PC), and linear carbonate such as dimethyl carbonate (DMC), diethyl carbonate (DEC) and ethyl methyl carbonate (EMC) are used with lithium salts such as $LiPF_6$, $LiBF_4$, $LiN(SO_2CF_3)_2$, $LiN(SO_2F)_2$, $LiN(SO_2C_2F_5)_2$ and Lithium bis(oxalate) borate ($LiB(C_2O_4)_2$) for current lithium ion batteries.

Recently, it becomes more and more important to develop lithium ion batteries with both high energy density and fast chargeability, especially for the automotive application. For example, JP 2009-064574 A discloses a double-layered anode, which has a low rate layer comprising artificial graphite closer to a current collector and a high rate layer comprising natural graphite on the low rate layer. Moreover, JP2015-002122 discloses graphite particles covered with at least one material selected from (1) Si or Si compounds, (2) Sn or Sn compounds, and (3) soft carbons at the edge portion to increase the charging rate.

CITATION LIST

Patent Literature

PTL 1: JP2009-64574A
PTL 2: JP2015-2122A

SUMMARY OF INVENTION

Technical Problem

However, the cost for producing the anode material of JP2009-064574A is extremely high and the control of the material quality is difficult. Also, the synthesis of the materials in JP2015-002122A is difficult and costly; the 6 C charge property is not descripted in this patent. As a result, the conventional anode materials as well as electrolyte systems are hard to satisfy the requirements for both high energy density and fast chargeability.

Therefore, an object of the present invention is to provide a new lithium ion battery system that can have both high energy density and fast chargeability.

Solution to Problem

In order to solve these problems, a new battery system is proposed with a cathode including a cathode active material particle and a carbon conductive additive forming an island-bridge structure.

That is, one aspect of the present invention can provide a cathode including a cathode active material particle and a carbon conductive additive forming an island-bridge structure on the surface of the cathode active material particle, wherein the carbon conductive additive includes graphenes partially covered with the surface of the cathode active material particle to form island, carbon blacks attached on the surface of the graphene and, carbon nanotubes connecting between graphenes as a bridge.

Another aspect of the present invention can provide a lithium ion battery including the above cathode and an electrolytic solution including an imide anion based lithium salt and $LiPO_2F_2$.

Advantageous Effects of Invention

According to one aspect of the present invention, a fast chargeable lithium ion battery can be provided.

EXAMPLE EMBODIMENT

Lithium Ion Battery

A lithium ion battery of one example embodiment of the present invention includes a positive electrode (i.e., cathode) and a negative electrode (i.e., anode), and non-aqueous electrolytic solution. This invention proposes a special combination of cathode materials and electrolyte with additives to fabricate lithium ion batteries with fast chargeable capabilities.

(Anode)

The anode of the present embodiment, but is not specifically limited, preferably includes a carbon active particle and a nano-carbon additive.

<Carbon Active Particle>

The carbon active particle can be selected from natural graphite, artificial graphite, soft carbon, hard carbon, MCMB, or their composition. The shape of the carbon active particle can be spherical or flake. However, the spherical graphite particles are preferred since the compatibility of battery industry and ease of process.

The size of the carbon active particles can be in the range of 1 μm to 30 μm, 5 μm to 20 μm is more preferred, and 7 μm to 10 μm is most preferred. This is because the larger particle size will have a longer in-plane lithium ion diffuse distance when intercalation, that attribute to poor charge rate, in contrast, very small carbon particles, such as less than 1 μm will have a lot of edge plane which will have irreversible reactions with electrolyte at initial charge and discharge, which lead to low initial coulombic efficiency. The specific surface area of the carbon particle is preferably to be controlled, in the range of 1 $m^2/g$ to 15 $m^2/g$ so as to have an acceptable initial coulombic efficiency. The carbon material can also have both pores on the surface and hollow or interconnected pores, or interconnected inside cracks at the core part of the graphite particles. Regarding to the definition of the core part, it is defined as the inner 70% of the volume of the carbon particles.

(Cathode)

The cathode of the present embodiment includes a cathode active material particle and a carbon conductive additive forming an island-bridge structure As for the cathode active material, there is also no particular restriction on the type or nature thereof, known cathode materials can be used for practicing the present embodiment. The cathode materials can be at least one material selected from the group consisting of lithium cobalt oxide, lithium nickel oxide, lithium manganese oxide, lithium vanadium oxide, lithium-mixed metal oxide, lithium iron phosphate, lithium manganese phosphate, lithium vanadium phosphate, lithium mixed metal phosphates, metal sulfides, and combinations thereof. The cathode active material may also be at least one compound selected from chalcogen compounds, such as titanium disulfate or molybdenum disulate. More preferred are lithium cobalt oxide (e.g., $Li_xCoO_2$ where $0.8 \le x \le 1$), lithium nickel oxide (e.g., $LiNiO_2$) and lithium manganese oxide (e.g., $LiMn_2O_4$ and $LiMnO_2$) because these oxides provide a high cell voltage. Lithium iron phosphate is also preferred due to its safety feature and low cost.

Regarding the average particle size of the cathode active material, from the viewpoint of reactivity with the electrolytic solution, rate properties, and the like, for example, a cathode active material having an average particle diameter in the range of 0.1 to 50 μm can be used. The average particle diameter is preferably in the range of 1 to 30 μm, more preferably in the range of 5 to 25 μm. Here, the average particle diameter means the particle diameter (median diameter: D50) at the cumulative value of 50% in the particle size distribution (volume basis) by the laser diffraction scattering method.

In this invention, it is preferably to use layered structure lithium-mixed metal oxide such as $LiCo_{0.8}Ni_{0.2}O_2$, $LiNi_{0.4}Co_{0.3}Mn_{0.3}O_2$, $LiNi_{0.5}Co_{0.2}Mn_{0.3}O_2$, $LiNi_{0.5}Co_{0.3}Mn_{0.2}O_2$, $LiNi_{0.8}Co_{0.1}Mn_{0.1}O_2$, $LiNi_{0.8}Co_{0.15}Al_{0.05}O_2$, $Li_{1.2}Mn_{0.4}Ni_{0.4}O_2$, $Li_{1.2}Mn_{0.6}Ni_{0.2}O_2$, $Li_{1.2}Mn_{0.56}Ni_{0.17}Co_{0.07}O_2$, $Li_{1.2}Mn_{0.54}Ni_{0.13}Co_{0.13}O_2$, $Li_{1.2}Mn_{0.56}Ni_{0.17}Co_{0.07}O_2$, $Li_{1.2}Mn_{0.54}Ni_{0.13}Co_{0.13}O_2$, $LiNi_{0.8}Co_{0.15}Al_{0.05}O_2$, $LiNi_{0.5}Mn_{1.48}Al_{0.02}O_4$, $LiNi_{0.4}Co_{0.2}Mn_{1.25}Ti_{0.15}O_4$, $Li_{1.2}Ni_{0.18}Mn_{0.54}Co_{0.08}O_2$ as cathode materials. Moreover, the layered structure cathode materials can be used alone or in combination of two or more materials. For example, NCM523 can be combined with NCM811 with the ratio of 1:1 as a cathode material. Here, NCMabc such as NCM523 and NCM811 is an abbreviation of lithium-nickel-cobalt-manganese complex oxides where a, b and c are mole ratios of nickel, cobalt and manganese, respectively.

<Carbon Conductive Additive>

Figure 1:
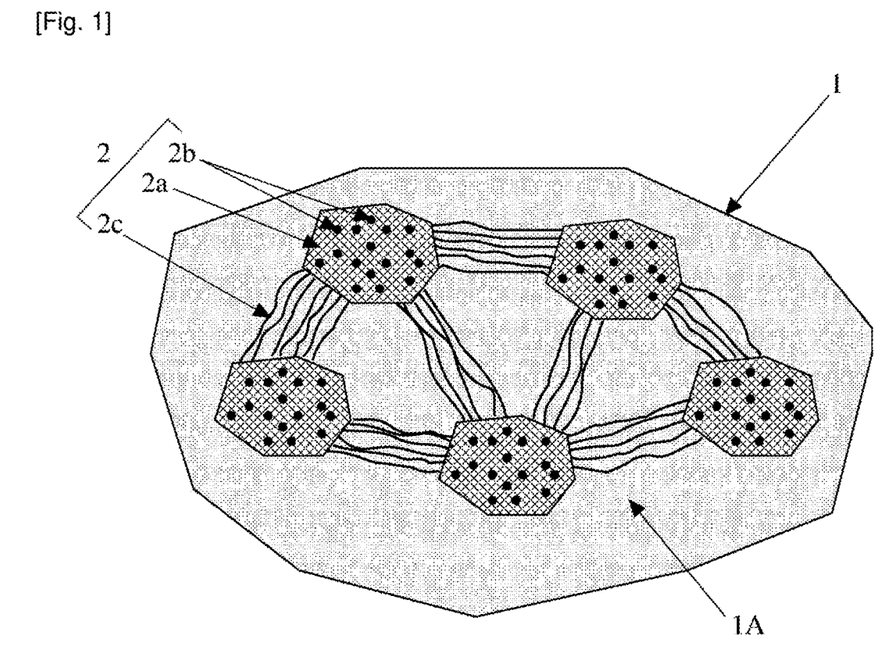
FIG. 1 shows a conceptual diagram of the cathode according to the one example embodiment.

In the present embodiment, three kinds of carbon conductive additives, i.e., carbon black, graphene and carbon nanotube are used. These conductive additives are added to the cathode slurry containing cathode active material particles. These conductive additives can form island-bridge structure on the surface (1A) of the cathode active material particle 1 as shown in FIG. 1. That is, graphenes (2a) partially cover on the surface 1A, which is called as 'island'; carbon blacks 2b attach on the graphenes 2a and carbon nanotubes 2c connect between graphenes 2a, which is called as 'bridge'. Such an island-bridge structure can greatly decrease the charge transfer resistance when lithium ion transfers from bulk electrolyte to cathode SEI (Solid-Electrolyte-Interface). As a result, the rate capabilities at both room temperature and low temperature are improved.

In this embodiment, it is preferable to use monolayer or multi-layered graphene with up to 30 layers. The graphene with more than 30 layers may be less effective for rate performance. The size of the graphenes, but is not specifically limited as long as being smaller than the diameter of the cathode active material particles, is preferably 10 nm to 1 μm.

The carbon nanotubes (CNTs) used in this embodiment can be either single-walled carbon nanotubes or multi-walled carbon nanotubes. The length of the CNTs can be in a range of 5 nm to 50 μm. When the length of the CNTs is within the above range, good conductive network can be formed on the cathode active material particles and good dispersibility can be provided at the time of preparing the electrode slurry. The diameter of the CNTs, but is not specifically limited, is preferably 1.2 nm to 100 nm. The purity of the CNT is preferably higher than 95%. The specific surface area of the carbon nanotubes is preferably in a range of 10 to 300 $m^2/g$. The CNTs can be dispersed in water or N-methylpyrrolidone (NMP) or other solvent for the easy preparation of the electrode slurry. The concentration can be 10% by weight in water or NMP. Surfactant can be used to well disperse CNTs, especially in water based solution. Examples of the surfactants include octylphenol ethoxylate (Triton X-100, trade name, manufactured by Dow Chemicals), sodium dodecyl sulfate (SDS) and polyvinylpyrrolidone (PVP). To fabricate the CNT dispersions, 0.5-3% by weight of the surfactant, can be added.

As for the carbon black, commercially available carbon black for lithium-ion batteries, such as Timcal Super C65 and Super C45 can be used in this embodiment. The carbon black is easily adhered on the surface of the graphene. The carbon black may be adhered on the surface of the carbon nanotubes or the cathode active material particles.

The weight ratio of graphene to CNTs is preferably 1/5 to 5/1. The total amount of graphene and CNTs, is preferably in a range of 0.5 to 10 parts by weight, more preferably in a range of 1 to 7 parts by weight per 100 parts by weight of the cathode active material. The amount of the carbon black is preferably in a range of 0.5 to 10 parts by weight, more preferably in a range of 5 to 10 parts by weight per 100 parts by weight of the cathode active material. Therefore, the amount of the carbon conductive additive is preferably in a range of 1 to 20 parts by weight, more preferably in a range of 6 to 17 parts by weight per 100 parts by weight of the cathode active material.

(Binder)

For the preparation of an electrode, binder is needed to be used for both anode and cathode. Examples of the binder include polytetrafluoroethylene (PTFE), polyvinylidene fluoride (PVDF), ethylene propylene diene copolymer (EPDM), or styrene-butadiene rubber (SBR). When using SBR, carboxy methyl cellulose (CMC) is preferably used as a binding auxiliary.

(Electrolytic Solution)

Electrolytic solution includes an electrolyte, an additive and non-aqueous solvent. In particular, the electrolytic solution of the present invention includes imide anion based lithium salt as the electrolyte and lithium difluorophosphate as the additive.

<Electrolyte>

The electrolyte is preferably used as a composite of an imide anion based lithium salt such as lithium bis(fluorosulfonyl) imide (LiFSI) composed with a conventional lithium salt, such as lithium hexafluorophosphate ($LiPF_6$), lithium tetrafluoroborate ($LiBF_4$) et al. The composite of LiFSI and $LiPF_6$ is preferably used.

The total concentration of the electrolyte can be in the range of 0.1 to 3 moles/L. The range is preferable to 0.5 to 2 moles/L. When the range is 0.1 moles/L or more, sufficient ion conductivity can be obtained. When the range is 3 moles/L or less, it can be avoided to become the viscosity of electrolytic solution too high. The mole ratio of the imide anion based lithium salt to the lithium salt can be selected from 1/9 to 9/1. The use of the imide anion based lithium salt can have to a quick desolvation effect when intercalation, which attribute to faster charging rate than conventional electrolyte system. However, the usage of pure ionic liquid such as LiFSI will etch the Al current collector at a full charged state; the use of composite electrolyte can effectively prevent the corrosion of Al current collector.

<Solvent>

A wide range of solvent can be used for lithium ion battery. Most preferred are non-aqueous and polymer gel electrolytes although other types can be used. Any known non-aqueous solvent which has been employed as a solvent for a lithium secondary battery can be employed. A mixed solvent comprising ethylene carbonate (EC) and at least one kind of non-aqueous solvent whose melting point is lower than that of ethylene carbonate and whose donor number is 18 or less may be preferably employed as the non-aqueous solvent. This non-aqueous solvent is advantageous in that it is (a) stable against a negative electrode containing a carbonaceous material well developed in graphite structure; (b) effective in suppressing the reductive or oxidative decomposition of electrolyte; and (c) high ion conductivity. A non-aqueous solvent solely composed of ethylene carbonate (EC) is advantageous in that it is relatively stable against decomposition although a reduction by a graphitized carbonaceous material. However, the melting point of EC is relatively high, 39-40° C., and the viscosity thereof is relatively high, so that the conductivity thereof is low, thus making EC alone unsuited for use as a secondary battery electrolyte solvent to be operated at room temperature or lower. The second solvent to be used in the mixed solvent with EC functions to make the viscosity of the mixed solvent lowering than that of which EC is used alone, thereby improving an ion conductivity of the mixed solvent. Furthermore, when the second solvent having a donor number of 18 or less (the donor number of ethylene carbonate is 16.4) is employed, the aforementioned ethylene carbonate can be easily and selectively solvated with lithium ion, so that the reduction reaction of the second solvent with the carbonaceous material well developed in graphitization is assumed to be suppressed. Further, when the donor number of the second solvent is controlled to not more than 18, the oxidative decomposition potential to the lithium electrode can be easily increased to 4 V or more, so that it is possible to manufacture a lithium secondary battery of high voltage. Preferable second solvents are dimethyl carbonate (DMC), methyl ethyl carbonate (MEC), diethyl carbonate (DEC), ethyl propionate, methyl propionate, propylene carbonate (PC), γ-butyrolactone (γ-BL), acetonitrile (AN), ethyl acetate (EA), propyl formate (PF), methyl formate (MF), toluene, xylene and methyl acetate (MA). These second solvents may be employed singly or in a combination of two or more. More desirably, this second solvent should be selected from those having a donor number of 16.5 or less. The viscosity of this second solvent should preferably be 28 cps or less at 25° C. The mixing ratio of the aforementioned ethylene carbonate in the mixed solvent should preferably be 10 to 80% by volume. If the mixing ratio of the ethylene carbonate falls outside this range, the conductivity of the solvent may be lowered or the solvent tends to be more easily decomposed, thereby deteriorating the charge/discharge efficiency. More preferable mixing ratio of the ethylene carbonate is 15 to 50% by volume. The larger content of EC will attribute to higher energy cost of desolvation which affects the charging speed, DMC and EMC are also included in this invention as a ternary solvent system of EC/DMC/EMC for better viscosity and ion conduction. The volume ratio of EC/DMC/EMC is defined as x:y:100−x−y, where x is 15 to 50% by volume, y is 20 to 60% by volume and x+y is less than 100% by volume. The volume ratio y of DMC is more preferably 30 to 50% by volume.

<Additives>

In this embodiment, lithium difluorophosphate ($LiPO_2F_2$) is added to the solvent for better rate capability. 0.005-7 wt % addition to the solvent is preferred; 0.01-5 wt % is most preferred. The decomposition of $LiPO_2F_2$ can form a thin and highly conductive film on cathode materials that favorable to the fast charge and discharge capability.

(Cell)

The positive and negative electrodes (cathode and anode) can be formed by applying an electrode compound slurry on a current collector such as copper foil for the negative electrode and aluminum or nickel foil for the positive electrode. The current collector can be deposited on a preformed electrode active layer by CVD, sputtering and the like. However, there is no particularly significant restriction on the type of the current collector, provided that the collector can smoothly path current and have relatively high corrosion resistance. The positive and negative electrodes can be stacked with interposing a separator there between. The separator can be selected from a synthetic resin nonwoven fabric, porous polyethylene film, porous polypropylene film, or porous PTFE film.

A casing for the battery in the exemplary embodiment may be, for example, a laminate film in which a substrate, a metal foil and a sealant are sequentially laminated. Examples of a substrate which can be used include a resin film with a thickness of 10 to 25 μm made of polyester (PET) or Nylon. A metal foil may be an aluminum film with a thickness of 20 to 40 μm. A sealant may be a rein film with a thickness of 30 to 70 μm made of polyethylene (PE), polypropylene (PP), modified polypropylene (PP) or an ionomer.

EXAMPLES

Comparative Example 1

Cathode:
$LiNi_{0.5}Co_{0.2}Mn_{0.3}O_2$ with the average diameter of 10 μm was used as a cathode active material. Cathode shiny was formulated by the weight ratio of the cathode active material:PVDF:carbon black (Timcal Super C65) as 89:4:7 and deposited on a 15 μm thick of Al current collector with the mass loading of 80 g/m². The density of the cathode was controlled at 2.8 g/cm³.
Anode:
Spherical natural graphite with the average diameter of 15 μm and specific surface area of 5 m²/g was used as anode active material. The anode slurry was formulated by a weight ratio of active materials:CMC:SBR:carbon black as 92:2:2:4 and deposited on a 20 μm Cu foil with the mass loading of 45 g/m². The density of the anode is controlled at 1.4 g/cm³.

Thus obtained cathode and anode were laminated interposing porous polypropylene separator. The resultant laminate and an electrolytic solution prepared as follows were sealed into an aluminum laminate container to fabricate a test cell.
Electrolytic Solution:
1 mole/L of $LiPF_6$ was dissolved in a mixed solvent of EC/DEC=3/7 (volume ratio) to prepare an electrolytic solution.

Comparative Example 2

Comparative Example 2 was performed in the same manner as in Comparative Example 1 except for the following:
Electrolytic Solution:
0.65 mole/L, of LiFSI and 0.65 mole/L of $LiPF_6$ as an electrolyte were dissolved in a mixed solvent of EC/DMC/EMC=2/4/4 (volume ratio) to prepare an electrolytic solution.

Comparative Example 3

Comparative Example 3 was performed in the same manner as in Comparative Example 2 except for the 1 wt % $LiPO_2F_2$ was added to the electrolyte.

Comparative Example 4

Comparative Example 4 was performed in the same manner as in Comparative Example 3 except for adding CNTs to the cathode slurry and changing the weight ratio of cathode active materials:PVDF:carbon black:CNTs as 85:4:7:4. As for the CNTs, multi-walled carbon nanotube with the average diameter of 10 nm and average length of was used.

Comparative Example 5

Comparative Example 5 was performed in the same manner as in Comparative Example 4 except for adding Graphene to the cathode slurry and changing the weight ratio of cathode active materials:PVDF:carbon black:Graphene as 85:4:7:4.

Multi-layer graphene with average 4 layers was used as Graphene.

Example 1

Example 1 was performed in the same manner as in Comparative Example 5 except for adding CNTs to the cathode slurry changing the weight ratio of cathode active materials:PVDF:carbon black:Graphene:CNTs as 85:4:7:3:1.

Multi-layer graphene with average 4 layers was used as Graphene and multi-walled carbon nanotube with the diameter of 10 nm, length of 1 μm was used as CNTs.

Figure 2:
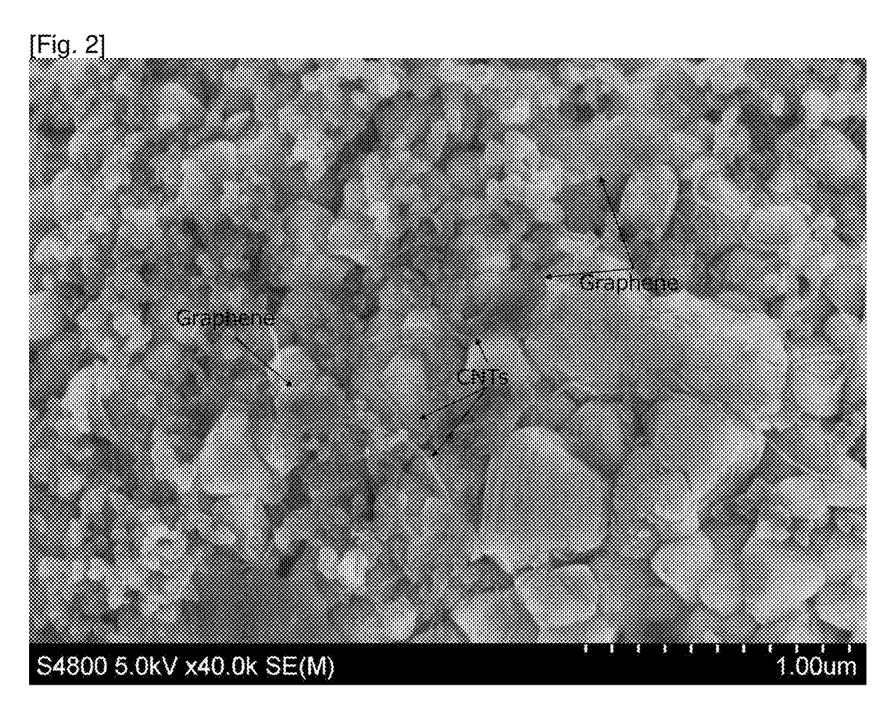
FIG. 2 shows a SEM image of the cathode surface in Example 1.
Figure 3:
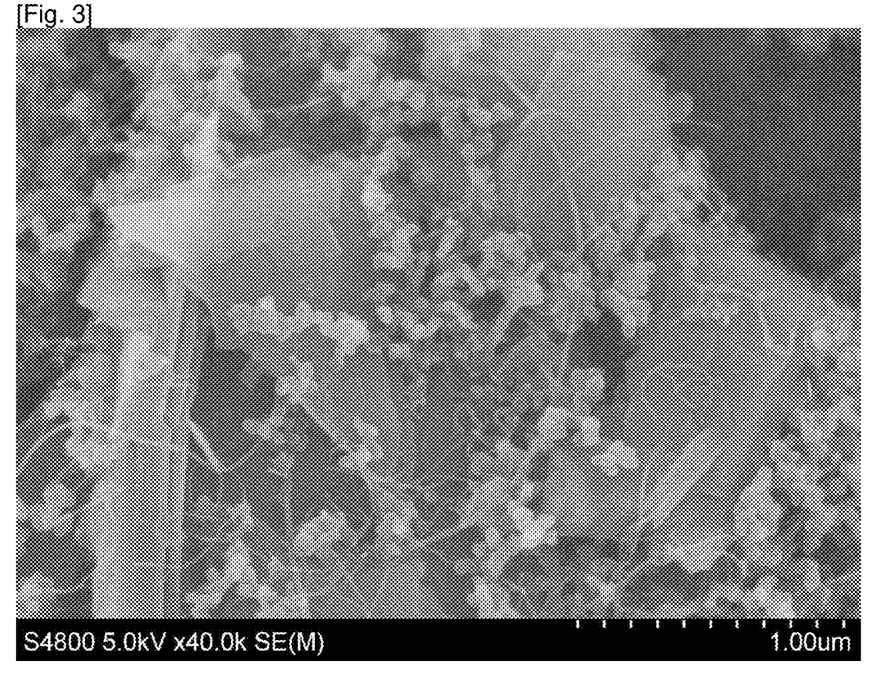
FIG. 3 shows another SEM image of the cathode surface in Example 1.

The SEM image of cathode is shown the island-bridge structure in FIG. 2 and FIG. 3. The surface of the cathode active material was partially covered with the graphenes as island, respective graphenes were connected by carbon nanotubes as bridge, fine particles of carbon black were attached on the surface of graphenes.

Example 2

Example 2 was performed in the same manner as in Example 1 except for changing the weight ratio of cathode active materials:PVDF:carbon black:Graphene:CNTs to 83:4:7:5:1.

Example 3

Example 3 was performed in the same manner as in Example 2 except for changing the weight ratio of cathode active materials:PVDF:carbon black:Graphene:CNTs to 85:4:7:2:2.

The electrochemical properties in Comparative Examples 1-5 and Examples 1-3 are shown in Table 1. The test cell was evaluated in rate capabilities of 6 C charge/0.1 C discharge and 10 C charge/0.1 C discharge at room temperature (20° C.) and low temperature (−10° C.).

The rate capabilities in Examples 1-3 with cathode including carbon conductive additives forming an island-bridge structure showed much better performance in room, temperature and low temperature than those in Comparative Examples 1-5 with conductive additives without forming island-bridge structure.

Figure 4:
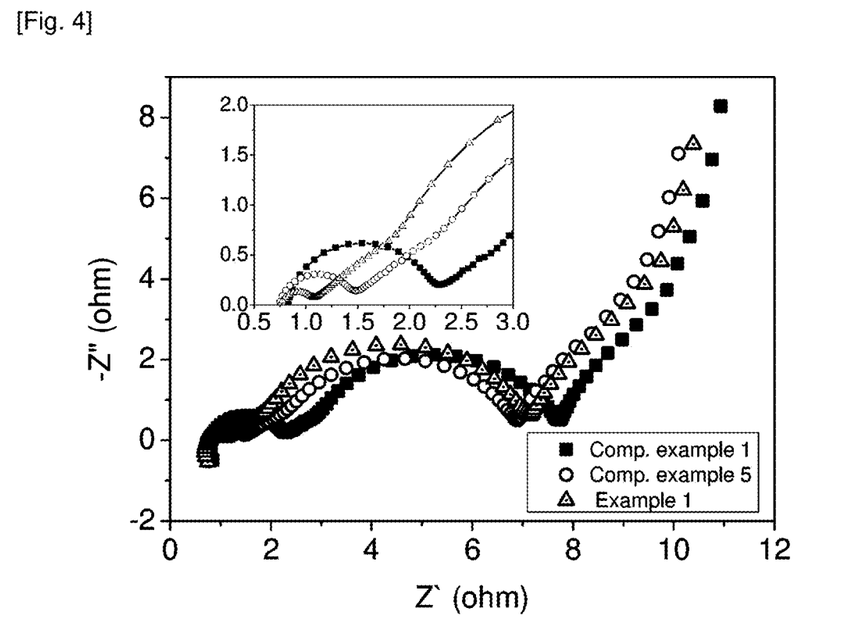
FIG. 4 shows results of EIS test for the cathodes in Example 1 and Comparative Examples 1 and 5.

FIG. 4 shows the EIS (Electrochemical Impedance Spectroscopy) of Comparative Examples 1 and 5 and Example 1. The EIS test was performed by the following procedures: The laminate cells were charged and discharged in 2 initial cycles between 2.5V to 4.2V at a rate of 0.1 C and charged to SOC50. The symmetric cells that contained two identical electrodes were configured using two cathode sheets. The AC impedance spectra were obtained at the open circuit voltage with 10 mV of an AC signal in the frequency range of 100 kHz to 10 MHz.

Example 1 with composite conductive additives showed much smaller initial curve than the other two examples (smaller charge transfer resistance of cathode SEI).

Figure 5:
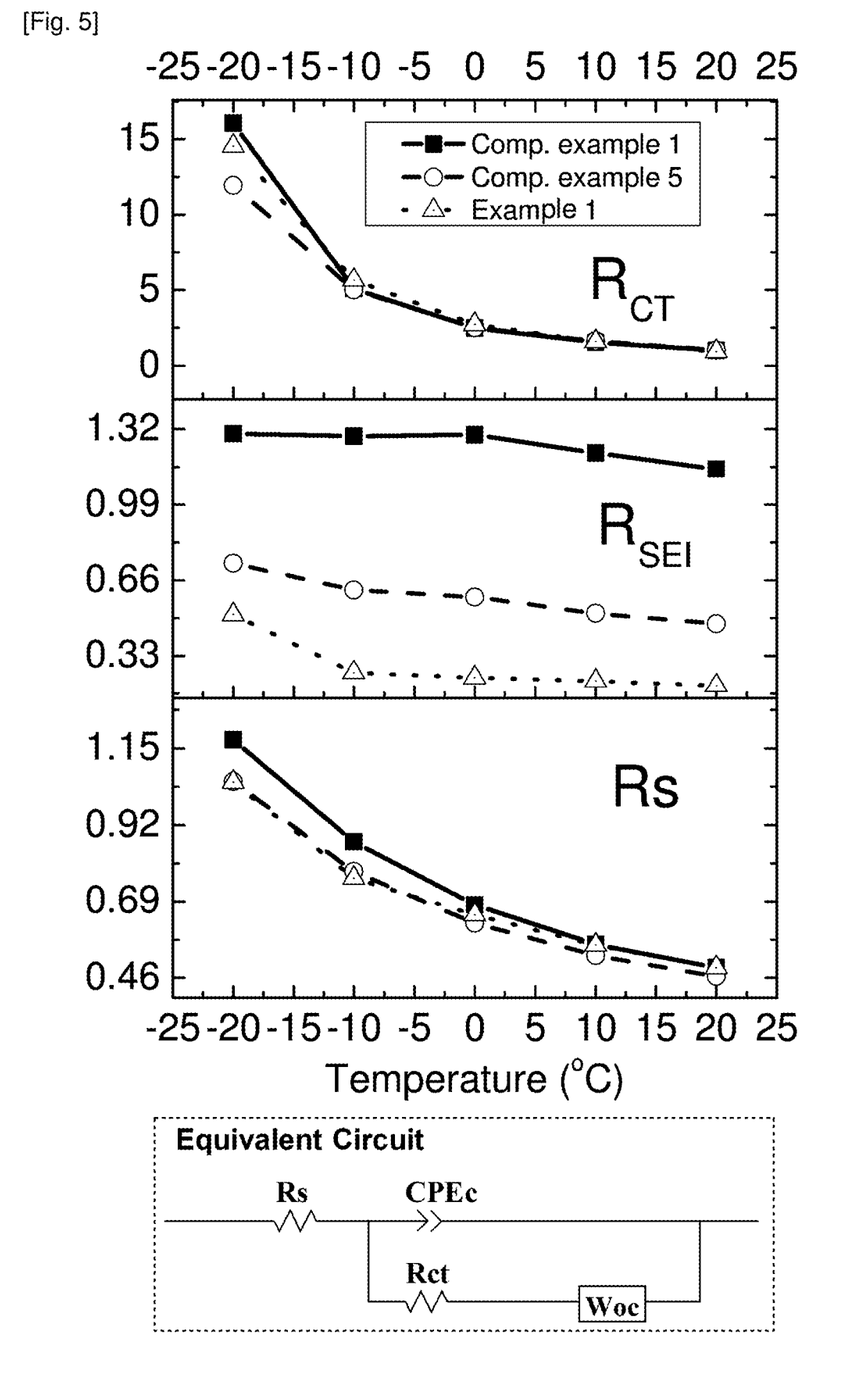
FIG. 5 shows results of fitted impedance for the cathodes in Example 1 and Comparative Examples 1 and 5.

FIG. 5 shows the fitted results of bulk resistance (Rs), SEI charge transfer resistance (Rsei) and charge transfer resistance (Rct). Each resistance was determined by the data fitting by using Zview with the designed equivalent circuit as shown in FIG. 5 to achieve the minimum, value of the error. Woc represents Warburg impedance.

As shown in FIG. 5, Example 1 showed the smallest Rsei and Rct in low temperature.

Figure 6:
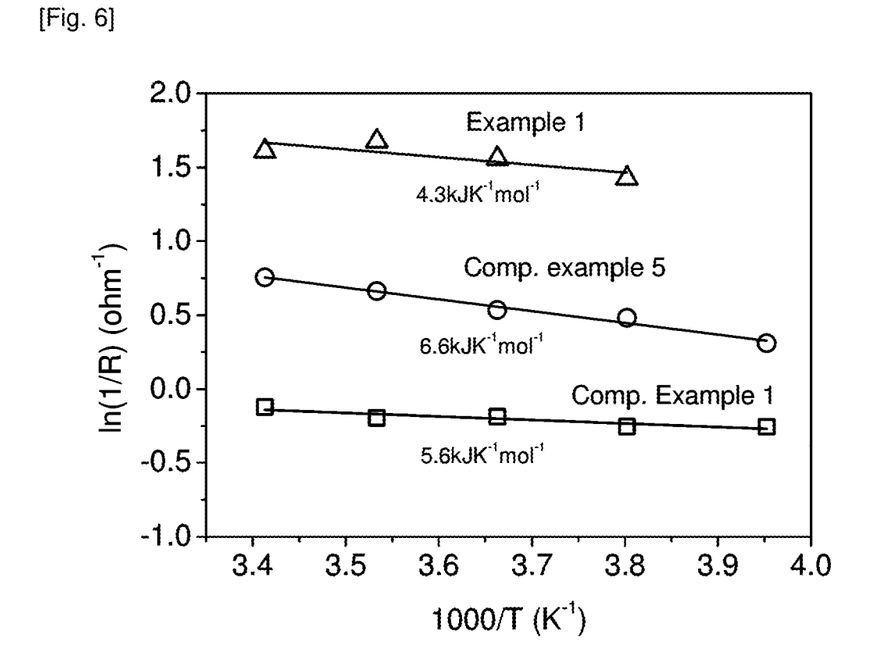
FIG. 6 shows a graph of the calculated activation energy in Example 1 and Comparative Examples 1 and 5.

FIG. 6 shows calculated activation energy when lithium ions transferred from bulk electrolyte to cathode SEI in Comparative Examples 1, and 5, and Example 1 based on Rsci shown in FIG. 5. Example 1 showed the smallest activation energy.

TABLE 1

| | Electrolytic solution | | | | Electrochemical Properties | | | |
|---|---|---|---|---|---|---|---|---|
| | Electrolyte | Solvent (Volume ratio) | Additive | Conductive additive in cathode* | 6 C/0.1 C @20° C. | 10 C/0.1 C @20° C. | 6 C/0.1 C @-10° C. | 10 C/0.1 C @-10° C. |
| Comparative Example 1 | 1M LiPF$_6$ | EC/DEC (3/7) | — | CB: 7 wt % | 71 | 81 | 48 | 46 |
| Comparative Example 2 | 0.65M LiPF$_6$ 0.85M LiFSI | EC/DMEMC (2/4/4) | — | CB: 7 wt % | 76 | 68 | 50 | 48 |
| Comparative Example 3 | 0.65M LiPF$_6$ 0.65M LiFSI | EC/DMC/EMC (2/4/4) | LiPO$_2$F$_2$ 1 wt % | CB: 7 wt % | 76 | 68 | 73 | 68 |
| Comparative Example 4 | 0.65M LiPF$_6$ 0.65M LiPSI | EC/DC/EMC (2/4/4) | LiPO$_2$F$_2$ 1 wt % | CB: 7 wt % + CNT: 4 wt % | 76 | 69 | 75 | 68 |
| Comparative Example 5 | 0.65M LiPF$_6$ 0.65M LiFSI | EC/DMC/EMC (2/4/4) | LiPO$_2$F$_2$ 1 wt % | CB: 7 wt % + GR: 4 wt % | 80 | 76 | 74 | 72 |
| Example 1 | 0.65M LiPF$_6$ 0.65M LiFSI | EC/DMC/EMC (2/4/4) | LiPO$_2$F$_2$ 1 wt % | CB: 7 wt % + GR: 3 wt % + CNT: 1 wt % | 84 | 80 | 80 | 80 |
| Example 2 | 0.65M LiPF$_6$ 0.65M LiFSI | EC/DMG/EMC (2/4/4) | LiPO$_2$F$_2$ 1 wt % | CB: 7 wt % GR: 5 wt % + CNT: 1 wt % | 84 | 81 | 84 | 80 |
| Example 3 | 0.65M LiPF$_6$ 0.65M LiFSI | EC/DMC/EMC (2/4/4) | LiPO$_2$F$_2$ 1 wt % | CB: 7 wt % + GR: 2 wt % + CNT: 2 wt % | 81 | 76 | 80 | 75 |

*CB: Carbon black CNT: Carbon nanotube GR: Graphene

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

The invention claimed is:

1. A cathode comprising a cathode active material particle and a carbon conductive additive forming an island-bridge structure on the surface of the cathode active material particle,
    wherein the carbon conductive additive comprises graphenes partially covered with the surface of the cathode active material particle to form an island structure, carbon blacks attached on the surface of the graphene and carbon nanotubes connecting between graphenes as a bridge structure, and
    wherein a weight ratio of the graphenes to the carbon nanotubes is 5/1 to 1/5, a total amount of the graphenes and the carbon nanotubes is 0.5 to 10 parts by weight per 100 parts by weight of the cathode active material particle, and an amount of the carbon black is 5 to 10 parts by weight per 100 parts by weight of the cathode active material particle.

2. The cathode according to claim 1, wherein the graphene is a monolayer graphene and/or multi-layered graphene with up to 30 layers.

3. The cathode according to claim 1, wherein the length of the carbon nanotube is 5 nm to 50 μm; and the diameter of the carbon nanotube is 1.2 nm to 100 nm.

4. The cathode according to claim 1, wherein the weight ratio of graphene to the carbon nanotubes is from 5/1 to 1/1.

5. The cathode according to claim 1, wherein the total amount of the graphenes and the carbon nanotubes is 1 to 7 parts by weight per 100 parts by weight of the cathode active particle.

6. A lithium ion battery, comprising the cathode according to claim 1, and an electrolytic solution comprising an ionic liquid of an imide anion based lithium salt and LiPO$_2$F$_2$.

7. The lithium ion battery according to claim 6, wherein the electrolytic solution comprises a composite of the ionic liquid and a lithium salt other than the ionic liquid as an electrolyte and the mole ratio of the ionic liquid to the lithium salt is from 1/9 to 9/1.

8. The lithium ion battery according to claim 6, wherein the total concentration of the electrolyte in the electrolytic solution is in the range of 0.1 to 3 moles/L.

9. The lithium ion battery according to claim 6, wherein the electrolytic solution comprises ethylene carbonate (EC), dimethyl carbonate (DMC) and ethyl methyl carbonate (EMC) as solvents, with the volume ratio of EC/DMC/EMC being x:y:100−x−y, where x is 15 to 50% by volume, y is 20 to 60% by volume and x+y is less than 100% by volume.

10. The lithium ion battery according to claim 6, wherein an amount of LiPO$_2$F$_2$ is 0.005 to 7 wt % in the electrolytic solution.

11. A lithium ion battery, comprising the cathode according to claim 2, and an electrolytic solution comprising an ionic liquid of an imide anion based lithium salt and LiPO$_2$F$_2$.

12. The lithium ion battery according to claim 11, wherein the electrolytic solution comprises a composite of the ionic liquid and a lithium salt other than the ionic liquid as an electrolyte and the mole ratio of the ionic liquid to the lithium salt is from 1/9 to 9/1.

13. A lithium ion battery, comprising the cathode according to claim 3, and an electrolytic solution comprising an ionic liquid of an imide anion based lithium salt and LiPO$_2$F$_2$.

14. The lithium ion battery according to claim 13, wherein the electrolytic solution comprises a composite of the ionic liquid and a lithium salt other than the ionic liquid as an electrolyte and the mole ratio of the ionic liquid to the lithium salt is from 1/9 to 9/1.

15. A lithium ion battery, comprising the cathode according to claim 4, and an electrolytic solution comprising an ionic liquid of an imide anion based lithium salt and $LiPO_2F_2$.

16. The lithium ion battery according to claim 15, wherein the electrolytic solution comprises a composite of the ionic liquid and a lithium salt other than the ionic liquid as an electrolyte and the mole ratio of the ionic liquid to the lithium salt is from 1/9 to 9/1.

17. A lithium ion battery, comprising the cathode according to claim 5, and an electrolytic solution comprising an ionic liquid of an imide anion based lithium salt and $LiPO_2F_2$.

18. The lithium ion battery according to claim 17, wherein the electrolytic solution comprises a composite of the ionic liquid and a lithium salt other than the ionic liquid as an electrolyte and the mole ratio of the ionic liquid to the lithium salt is from 1/9 to 9/1.

* * * * *